Figure 1:
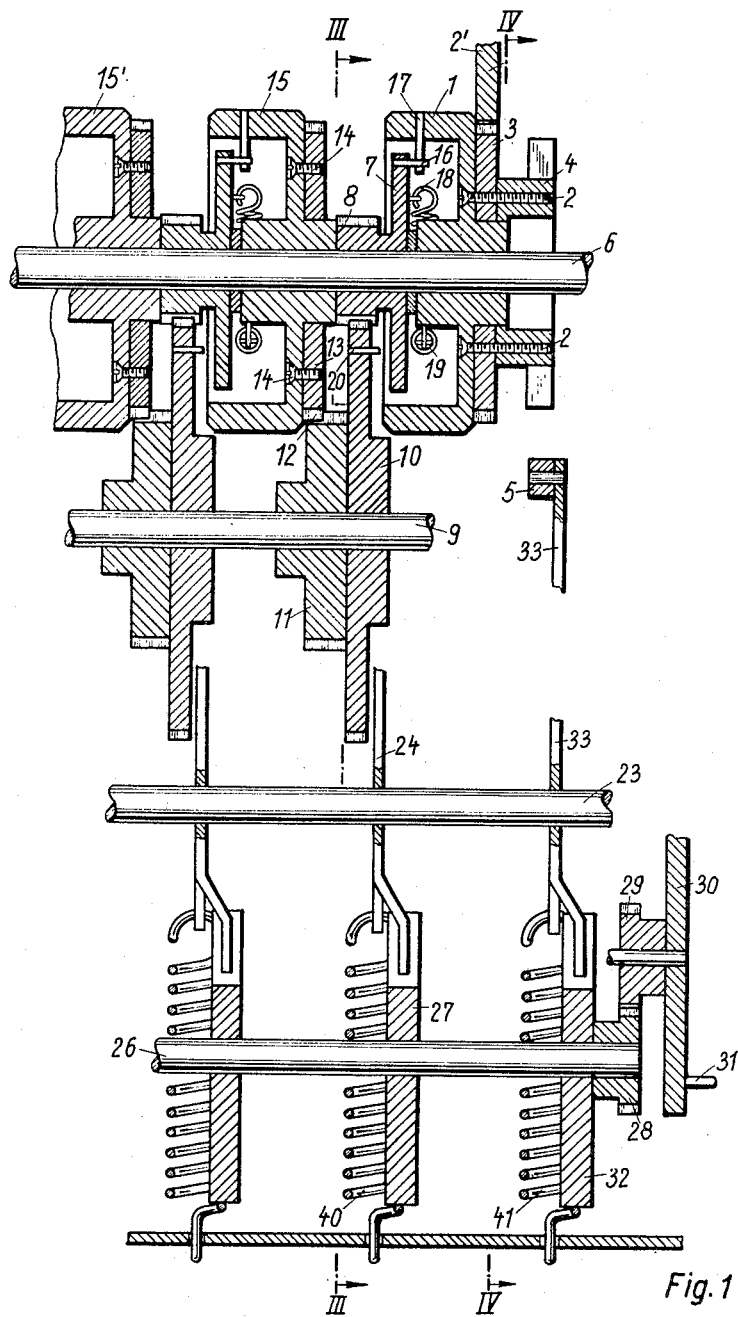

Aug. 28, 1956  H. SONNBERGER  2,760,723
COUNTING DEVICE FOR A RAPID SUCCESSION OF NUMBERS
Filed Dec. 8, 1954  2 Sheets-Sheet 2
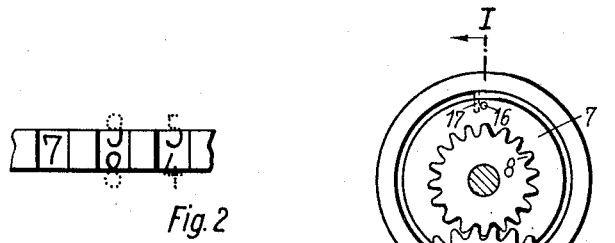

United States Patent Office 2,760,723
Patented Aug. 28, 1956

2,760,723

COUNTING DEVICE FOR A RAPID SUCCESSION OF NUMBERS

Heinrich Sonnberger, Heidenheim (Brenz), Wurttemberg, Germany, assignor to Carl Zeiss, Heidenheim (Brenz), Wurttemberg, Germany Application December 8, 1954, Serial No. 473,803

Claims priority, application Germany January 24, 1955

11 Claims. (Cl. 235—136)

The invention concerns a counting device for a rapid succession of numbers as are used for instance with arrangements for indication of a measuring distance with a large number of measuring units, e. g. $\frac{1}{100}$ mm., and whereby this measuring distance shall be traversed very rapidly. With the familiar apparatus of this kind the number wheel for the lowest measuring unit is driven in traversing the measuring distance, and the number wheels for the higher places are advanced by means of a toothed gear by $\frac{1}{10}$ of their circumference after each complete revolution of the preceding number wheel. The numbers which thereby appear in a reading window, in traversing the measuring distance jump forwards by jerks, so that exactly one number appears in the reading window from each cipher roll. These counting devices have the disadvantage that in rapid traversing of the measuring range the wheel of the lowest place is driven with a very high rapidity so that the periods for further advancing of the number wheels for the higher places become so small that damages occur, because a natural limit to these parts is drawn in reference to acceleration through the relation between mass and resistance.

The counting device in accordance with the invention eliminates this disadvantage, without relinquishing the advantage of the familiar counting devices, namely that for reading always precisely one cipher of each roll appears in the reading window, in that the cipher rolls of two succeeding decimals stand through a transmission in a releasable rotation connection, and that means are provided to be able to turn the cipher rolls into a reading position without influencing their neighboring cipher rolls. Through that the advantage is attained, that during the running procedure all counting wheels are coupled with one another free of acceleration and a jerky jumping of numbers is not necessary, as in the familiar instruments. Besides however, since only rarely one of the ciphers of the cipher rolls, in consequence of their acceleration-free rotation connection, will appear at the end of the measuring procedure exactly in the reading window, the cipher rolls through the provided means can be turned so independently of one another that a number from each cipher roll appears exactly in the reading window. Advantageously each transmission is formed through an intermediary cogwheel, which is connected with the cipher roll of the lower decimals in the transmission ratio 1:3 and with the cipher roll of the higher decimals in the transmission ratio 10:3. The means for the rotation of the cipher rolls engage the intermediary cogwheels. Then only three distinguished positions of each intermediary cogwheel are required when the intermediary cogwheel is assigned to adjust the cipher roll of the higher decimals, because these then correspond to the ten reading positions of the cipher roll, in that the cipher roll of the higher decimals and the intermediary transmission are connected in the ratio 10:3. The means for the rotation of the individual intermediary cogwheels into the determined positions corresponding to reading positions of the cipher rolls, can consist of stops arranged on each intermediary cogwheel at an angle of 120° and of a lever, which upon activation in each case strikes on one of the stops and shoves this into one of the determined positions. Appropriately the stops and the lever are so formed that after shifting of one stop into the determined position, a second one so lies against the lever that the intermediary cogwheel is locked against rotation, whereby security is given that the cipher rolls after their orientation remain firmly stationary. Activation of the lever takes place advantageously through a cam disk, which presses on an arm of the lever.

In further development of the invention the rotation of the intermediary transmission into one of the definitely determined positions can take place against the force of a spring, whereby is attained, that after the reading procedure and after releasing the lever, the cipher roll automatically is turned into the position which it occupied before the orientation, so that a fresh measuring procedure on the basis of the old measuring value can at once follow.

In counting devices with several places the cam disks for all the levers activating the intermediary cogwheels, can be mounted on a common shaft in such manner that they activate the levers one after another, in such manner that the cipher rolls from the lower to the higher decimals are oriented one after another. The cam disks are appropriately so formed that with a half turn of the shaft all intermediary cogwheels are turned into the definitely determined positions and locked there. For orienting the lowest decimals their cipher roll advantageously shows a toothed ring with ten teeth, and appropriately a pressure means is provided which can engage in these teeth and presses the cipher roll in exactly one of the ten possible positions. The activation of the pressure means can take place through a further cam disk mounted on the shaft for the cam disks, so that with a half turn of the shaft the orientation of the cipher roll of the lowest decimals results first and following one after another those of the higher decimals. For the rotation of the shaft this can be connected across a suitable transmission with a motor. The rotation of the shaft can also take place by hand. Moreover for fixing the measuring result the shaft can be connected to a printing device. With advantage the counting device according to the same principle can also be developed for other than the decimal system of numbers.

In the drawing an example of the object of the invention is represented, namely there is shown in Fig. 1 a section through a counting device along the line I—I of Fig. 3, Fig. 2 the reading window of the counting device before orientation, Fig. 3 a section along the line III—III of Fig. 1 in changed scale, Fig. 4 a section along line IV—IV of Fig. 1.

On the cipher roll 1 of the lowest decimals is fastened by means of screws 2, a cogwheel 3, across which the cipher roll 1 receives its propulsion through a gearwheel 2'. On cogwheel 3 there is further fastened a cogwheel 4 with ten teeth, into which a pressure roll 5 for orientation of the cipher roll 1 can be pressed. The wheels 1, 3, and 4 are mounted rotatable on a shaft 6. On this shaft is further fastened rotatable a cogwheel 7, whose teeth 8 engage a cogwheel 10 mounted rotatable on a shaft 9. The cogwheel 10 is firmly connected with a further cogwheel 11 which engages the teeth 12 of a cogwheel 13 to which by means of screws 14 a cipher roll 15 for the next higher decimal is fastened. The cogwheel 7 shows a pin 16 and the cipher roll 1 a pin 17. The pins 16 and 17 are so arranged, that with turning of the cipher roll 1 counterclockwise, when one looks on the counting device from the right, the pins 16 and 17 lie against one another and assure a rigid connection. On cogwheel 7 there is further fastened one end 18 of a spring and on the cipher roll 1 the other end 19 of the spring. With rotation of the cipher roll 1 clockwise, when one looks on the counting device from the right, the cogwheel 7 is carried along by the spring. The rotation of the cogwheel 7 is transmitted to the cogwheels 10 and 11, whereby further the cogwheel 13 and therewith the cipher roll 15 are rotated. The transmission between the cipher roll 1 and the cogwheel 10 is selected 1:3 and the transmission between the cogwheel 11 and the cogwheel 13, 10:3.

The cogwheel 10 further shows three stops 20, 21, and 22 (Fig. 3) which in reference to the shaft 9 are displaced by 120° from one another. The stops are so mounted on the cogwheel 10 that if one of them e. g. stands in the position 21' exactly one number of the cipher roll 15 appears in the reading window. On a shaft 23 is fastened rotatable a lever 24, whose end 25 is activated by a cam disk 27 mounted firmly on a shaft 26. A spring 40 acts on the lever 24 so that its end 25 constantly lies against the cam disk 27. On shaft 26 is fastened a cogwheel 28 (Fig. 1) into which engages a further cogwheel 29 which is connected with a rotary disk 30 and a turning handle 31. On the shaft 23 is mounted rotatable a further lever 33 (Fig. 4), which carries the pressure roll 5 and is activated by a cam disk 32 which likewise is seated on the shaft 26 and a spring 41.

In Fig. 1 on the shaft 6 is mounted rotatable a further cipher roll 15' which is connected with the cipher roll 15 in the same manner as the cipher roll 15 with the cipher roll 1 and for the orientation of the cipher roll 15' corresponding means are provided as for the orientation of the cipher roll 15.

The mode of action of the counting device is as follows:

During the measuring procedure the cipher rolls 1 and 15 are actuated across the cogwheel 3 and the cogwheels 7, 10, 11 and 13, and across the corresponding transmission the cipher roll 15', which likewise can be connected in the described manner with further, not depicted, cipher rolls. In the reading window of Fig. 2 appear after completion of the measuring procedure, the ciphers of the cipher rolls 1, 15, and 15' e. g. in the depicted manner i. e. not oriented. Thereby, that during activation the cipher rolls were connected with one another without an escape mechanism the cipher rolls are all, with exception of the lowest decimals, turned too far after ending the measuring procedure. Through suitable turning of the rotary disk 30 the shaft 26 is given a half turn. Thereby the cam disk 32 mounted on it turns along and the spring 41 pulls the lever 33 so that the pressure roll 5 presses itself between the teeth of cogwheel 4 and orients this. The turning of the cipher roll 1 is accompanied by the turning of all the further cipher rolls in corresponding transmission. The cam disk 27 is so fastened to the shaft 26 that during this procedure the lever 24 executes no movement, but first subsequently, when the pressure roll 5 is engaged in the teeth of cogwheel 4. Then the lever 24 strikes on the pin 21 of the cogwheel 10 and pushes this into the position 21'. Through the thereby effected turning of the cogwheel 10 and the therewith connected cipher roll 15, because of the selected transmission between them, the next lower number of the cipher roll 15 is turned exactly into the reading window; for if e. g. the pin 21 executes a rotation by 120° for example from the position 22' to 21', then there appears in the reading window exactly the next lower number of the cipher roll 15. If the pin 21 after finishing of the measuring procedure had occupied the position depicted in Fig. 3 and correspondingly the cipher "nine" the position in the reading window depicted in Fig. 2, then to be sure the lever 24 would first strike on the pin 21 after a certain idling, however would likewise have pushed this into the position 21', so that the cipher roll 15 would again be turned so far that the next lower number would have appeared in the reading window. Besides, with the turning of the cogwheel 10 the pin 22 turned into the position 22' so that it rests against the lever 24 and on the one hand prevents a further turning of this lever and on the other hand secures the cogwheel 10 against further turning. With this turning the cipher roll 1 remained stationary, because it is still locked by the pressure roll 5. Only the spring 18, 19 tensed itself. In corresponding manner, following on cipher roll 15, the cipher roll 15' and eventually subsequent cipher rolls are oriented namely one after another, if only the cam disks are correspondingly formed and mounted on the shaft 26. After orientation of the ciphers in the reading window and after reading of the measuring result, the rotary disk 30 is turned either in the same direction of rotation or opposite so long until the cam disks reach the initial position. Thereby the levers 24 and 29 and eventually also the further ones again press themselves into the depicted positions. The springs 18, 19 then pull the cogwheels all back into the position which they had before the orientation, so that on the basis of the last measuring value a new measurement can immediately be undertaken.

I claim:

1. Counting device for rapid succession of numbers, comprising cipher rolls and transmissions connecting each cipher roll with its neighboring cipher rolls, each transmission being releasably connected at will with the cipher roll of the lower decimal, means engaging each transmission at will to set the transmission in a position where the therewith connected cipher roll of the higher decimal is in a reading position.

2. Counting device according to claim 1, characterized in that each transmission is formed by an intermediary cogwheel said cogwheel being releasable connected at will with the cipher roll of the lower decimal in the transmission ratio 1:3 and being fixedly connected with the cipher roll of the higher decimal in the transmission ratio 10:3.

3. Counting device for a rapid succession of numbers, comprising cipher rolls, each cipher roll being connected with its neighboring cipher rolls by an intermediary cogwheel said cogwheel being releasably connected at will with the cipher roll of the lower decimal in the transmission ratio 1:3 and being fixedly connected with the cipher roll of the higher decimal in the transmission ratio 10:3, comprising further means to turn each cipher roll in a reading position, said means consisting of stops mounted on each intermediary cogwheel at an angle of 120° and of levers arranged so that each lever upon activation strikes upon one of said stops of each cogwheel and pushes this cogwheel into one of its determined positions.

4. Counting device according to claim 3, characterized in that said stops and each lever are so formed, that after pushing forwards of one stop into the provided for position, a second stop lies against said lever so that the intermediary cogwheel is locked against rotation.

5. Counting device according to claim 3, characterized in that one arm of each lever glides upon a cam disk so that the activation of the lever follows through turning of said cam disk.

6. Counting device according to claim 3, characterized in that the rotation of each cogwheel into one of the definitely provided for positions results against the force of a spring.

7. Counting device according to claim 3, characterized in that said cogwheel is fixedly connected with a further cogwheel in the transmission ratio 1:3 and that said further cogwheel has a stop engaging a further stop mounted on the cipher roll of the lower decimal when rotating in the one direction, and that between the further cogwheel and said cipher roll a spring is provided one end of said spring being fixed on the cipher roll, the other end of said spring being fixed on the further cogwheel, so that rotation of the cogwheel in the other direction results against the force of said spring.

8. Counting device according to claim 3, characterized in that one arm of each lever glides upon a cam disk so that the activation of the lever follows through turning of said cam disk, the cam disks for all the levers activating said intermediary cogwheels being mounted on a common shaft in such manner that they activate the levers one after another, in such manner that the cipher rolls from the lower to the higher decimals are oriented one after another.

9. Counting device according to claim 3, characterized in that one arm of the lever glides upon a cam disk so that the activation of the lever follows through turning of said cam disk, all the cam disks being so formed, that with a half turn of them all intermediary cogwheels are turned into the definitely provided for positions.

10. Counting device according to claim 1, characterized in that the cipher roll of the lowest decimal shows a toothed ring with ten teeth and a pressure means is provided which can engage in the teeth and press the cipher roll exactly into one of the ten possible oriented positions.

11. Counting device for a rapid succession of numbers, comprising cipher rolls, each cipher roll being connected with its neighboring cipher rolls by an intermediary cogwheel said cogwheel being releasable connected at will with the cipher roll of the lower decimal in the transmission ratio 1:3 and being fixedly connected with the cipher roll of the higher decimal in the transmission ratio 10:3, comprising further means to turn each cipher roll in a reading position, said means consisting of stops mounted on each intermediary cogwheel at an angle of 120° and of levers arranged so that each lever upon activation strikes upon one of said stops of each cogwheel and pushes this cogwheel into one of its determined positions, one arm of each lever gliding upon a cam disk and all cam disks for all the levers being mounted on a common shaft, the cipher roll of the lowest decimal showing a toothed ring with ten teeth and a pressure means being provided to engage in said teeth and to press said cipher roll exactly into one of the ten oriented positions, the activation of the pressure means following through a further cam disk mounted on said shaft for the cam disks.

References Cited in the file of this patent
UNITED STATES PATENTS 2,228,820    Griffith et al.     Jan. 14, 1941